United States Patent
Harvey

(10) Patent No.: US 7,126,464 B2
(45) Date of Patent: Oct. 24, 2006

(54) METHOD AND APPARATUS FOR CONTROLLING A VALVE DURING A HAZARD EVENT

(75) Inventor: John M. Harvey, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 291 days.

(21) Appl. No.: 10/718,284

(22) Filed: Nov. 19, 2003

(65) Prior Publication Data

US 2005/0103391 A1    May 19, 2005

(51) Int. Cl.
*B60Q 1/52* (2006.01)
(52) U.S. Cl. ............... 340/471; 340/425.5; 251/89; 317/456; 417/9
(58) Field of Classification Search ............ 340/425.5
See application file for complete search history.

(56) References Cited

U.S. PATENT DOCUMENTS

| | | | | |
|---|---|---|---|---|
| 5,263,824 A | * | 11/1993 | Waldbeser et al. | ............ 417/10 |
| 5,786,750 A | * | 7/1998 | Cooper | ............ 340/425.5 |
| 5,999,087 A | * | 12/1999 | Gunton | ............ 340/309.5 |
| 6,580,367 B1 | * | 6/2003 | Roach | ............ 340/471 |

* cited by examiner

*Primary Examiner*—Daniel Wu
*Assistant Examiner*—George Bugg
(74) *Attorney, Agent, or Firm*—Phil Wadsworth; Richard Bachand

(57) ABSTRACT

A method and apparatus for controlling a valve during the detection of a hazard event. A hazard event is defined as an event that may endanger the health or safety of people or the environment from contamination of hazardous material carried by a vehicle. The hazard event may be detected from a condition of the vehicle, an input received from a vehicle operator, or a message received from a remote location. After detecting a hazard event, a valve located on the vehicle is controlled to prevent contamination from the hazardous material being transported.

14 Claims, 2 Drawing Sheets

METHOD AND APPARATUS FOR CONTROLLING A VALVE DURING A HAZARD EVENT

BACKGROUND

I. Field

The present invention relates generally to transportation and delivery systems, and more particularly, to a method and apparatus for controlling a valve for use with a vehicle transporting hazardous materials when a hazard event is detected.

II. Description of the Related Art

Advances in technology have provided for increased automation in many industries. For example, in the trucking industry, technology has allowed for the shipment and delivery of cargo virtually around the clock. Vehicles now carry and deliver cargo to all parts of the country. For example, cargo-carrying tractor-trailers may be driven hundreds or thousands of miles to reach a delivery site.

Typically, cargo is loaded into a trailer portion of a tractor-trailer vehicle and driven from point to point along a delivery route by a vehicle operator. Along the delivery route, intermediate stops may occur where portions of the cargo are unloaded for delivery or where new cargo is picked up. To facilitate efficient routing, sometimes a trailer is detached from its current tractor and left at a designated location for pickup by another tractor. The trailer may sit at this intermediate location for various lengths of time while waiting to be retrieved by another tractor. This detachable trailer arrangement allows shippers to plan the most efficient and cost effective routes for the delivery of the cargo. In some cases, the trailer acts as a storage container to store the cargo for an extended period of time.

Generally speaking, the vast majority of cargo carried by the trucking industry represents food or other consumer goods that do not pose a danger to the public during transportation. However, the trucking industry also transports hazardous materials (HAZMAT) that may pose a threat to the general public or the environment. For example, materials such as fuels, chemicals, oil, waste materials, or other hazardous materials may pose a serious risk to the public in the event of a vehicle accident, malfunction, or hijacking. For example, if a truck carrying a cargo of dangerous chemicals is involved in an accident, leakage of the chemicals may endanger lives or pose a serious risk to the environment.

Another problem facing the transportation industry is the threat of theft or hijacking to steal hazardous cargo from vehicles during transport. While cargo doors may be locked using conventional locking devices, they are typically easily defeated by the use of bolt cutters or other means to destroy the locking mechanisms. In the case of hazardous liquids or gases, however, it may be easy for thieves to stop a vehicle and to release hazardous liquids or gases into the environment, or into another container for later use by the thieves.

Therefore, what is needed is a system for controlling a hazardous material valve on a vehicle in the event of an accident, vehicle malfunction, or theft. It would be ideal to have such a control system operate without user intervention.

SUMMARY

In one embodiment, a method for controlling a valve located on a vehicle comprises detecting a hazard event and controlling the valve upon the occurrence of the hazard event. In one embodiment, the hazard event is detected from a condition of the vehicle. In another embodiment, the hazard event is detected from an input received from a vehicle operator. In yet another embodiment, the hazard event is detected from a message received from a remote location.

In another embodiment, an apparatus for controlling a valve located on a vehicle comprises means for detecting a hazard event, means for operating the valve, and means for controlling operation of the valve when a hazard event is detected.

In another embodiment, an apparatus for controlling a valve located on a vehicle comprises a transducer for detecting a hazard event, a solenoid for controlling operation of the valve, and a processor for detecting the hazard event and for sending a signal to the solenoid to control the solenoid upon the occurrence of the hazard event.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes methods and apparatus for controlling a valve after detecting a "hazard event", for use with a vehicle that is transporting hazardous material. It should be understood that the described embodiments could also be used in conjunction with virtually any type of vehicle including, but not limited to, trucks, buses, trains, aircraft, automobiles, and watercraft.

Figure 1:
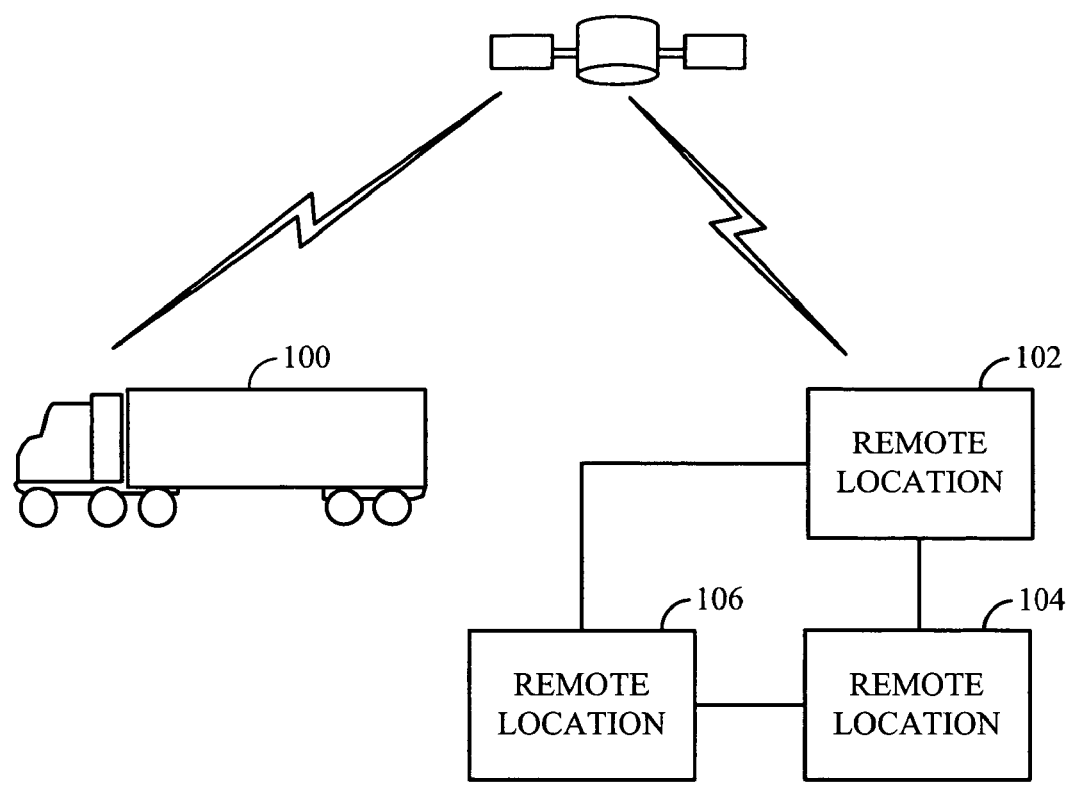
FIG. 1 shows a vehicle that includes one embodiment of a valve control system for detecting a hazard event.
Figure 2:
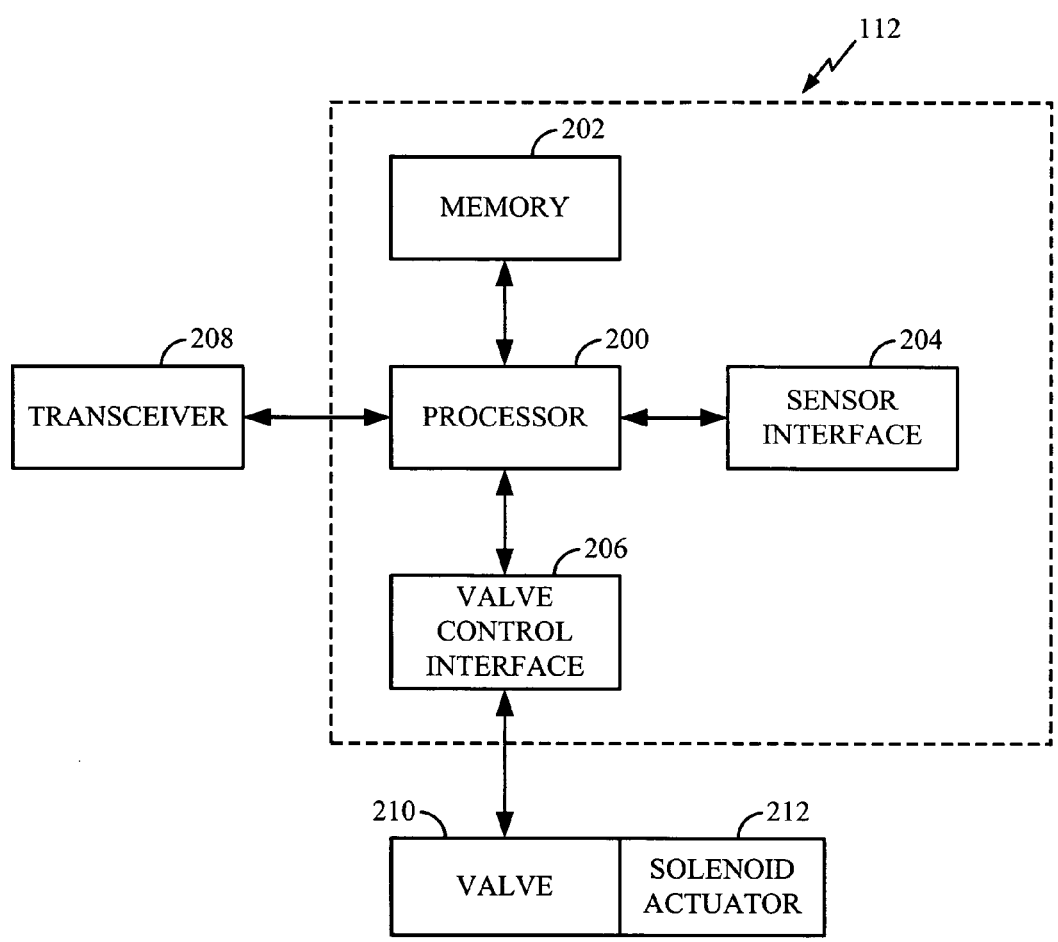
FIG. 2 shows a detailed functional diagram of one embodiment of the valve control system of FIG. 1.

FIG. 1 shows a vehicle 100 that includes one embodiment of a valve control system 112 (shown in FIG. 2). The vehicle 100 in this example comprises a tanker truck, commonly used to transport hazardous liquids, such as propane, gasoline, etc. The vehicle 100 may comprise a mobile communication terminal (MCT, not shown) for communicating with one or more remote locations using, in this embodiment, a satellite-based wireless communication system. Other types of wireless communication systems could be used in the alternative, or in addition to, the satellite communication system, such as a terrestrial cellular communication system, a wireless packet data communication system, radio frequency communication system (e.g., FM, AM, LMR systems), and so on. The satellite communication system provides two-way communications between vehicle 100 and third parties, such as a fleet management center or dispatch center, family members, governmental authorities, consignees, shippers, and so on.

Valve control system 112 is used to detect a "hazard event" and to control operation of a valve as part of vehicle 100 after the hazard event is detected. A hazard event is generally defined as an event that indicates that the hazardous material being transported by vehicle 100 may create a danger health or safety risk to people or the environment, whether vehicle 100 has been involved in an accident, malfunction, hijacking, or other emergency, or whether the vehicle has received notification from a remote location that valve control system 112 should be controlled for a reason either related to, or unrelated to, vehicle 100.

In one embodiment, remote location 102 comprises a central processing center, otherwise known as a central station, hub, or network management center (NMC), and serves as a central communication point between MCT-equipped vehicles and their respective dispatch centers, other designated office(s), shippers, consignees, governmental authorities, family members, and so on. For example, remote location 102 may pass communications between remote location 104 and vehicle 100. In this embodiment, remote location 104 comprises a vehicle dispatch center that generally monitors and/or communicates with a fleet of vehicles similar to vehicle 100.

Communications between remote location 104 and vehicle 100 may further be passed to one or more other remote locations, such as remote location 106. Remote location 106 comprises one of any number of interested third parties that are interested in communications between remote location 104 and vehicle 100. For example, remote location 106 could be another designated office of remote location 104, a shipper of materials being carried by vehicle 100, a consignee of materials being carried by vehicle 100, a governmental unit, an individual, and so on. Communications among remote locations 102, 104, and 106 may be carried out by any known communication techniques, including telephone, Internet, dedicated lines, wireless links, and so on.

The MCT located on vehicle 100 transmits and receives communications wirelessly using, in one embodiment, a satellite-based wireless communication system to communicate with remote location 102. Other wireless systems could be used in addition or in the alternative, such as an analog or a digital cellular telephone system, an RF communication system, or a wireless data communication network, such as a cellular digital packet data (CDPD) network. In other embodiments, the MCT may communicate directly with interested parties, such as remote locations 104, and 106, without communicating through remote location 102. Thus, it is possible for information determined by valve control system 112 to be transmitted to one or more remote locations, as discussed above, or for valve control system 112 to receive commands from one or more remote locations.

In one embodiment, the valve control system 112 comprises a communication link that which allows communication with an on-board MCT to allow communication between the valve control system 112 and remote location via the MCT. In another embodiment, valve control system 112 comprises its own circuitry for allowing wireless communications between valve control system 112 and a remote location. In yet another embodiment, valve control system 112 is not capable of communicating with remote entities at all.

The valve control system 112 is coupled to one or more vehicle systems and/or vehicle sensors to determine when a hazard event has occurred. For example, valve control system 112 may have connections to vehicle lights, horns, alarms, ignition or other engine systems, and/or cargo mechanisms, such as control valves, door locks, fire control systems, heating or cooling systems, environmental detectors (e.g., a Geiger counter, a temperature sensor, a smoke detector, a pressure sensor), or other systems. The valve control system 112 may also have connections to various vehicle sensors, such as engine sensors, accelerometers, temperature sensors, speed sensors, position sensors (i.e., GPS system), or roll-over sensors. The valve control system 112 uses the information from these sensors to determine if a hazard event has occurred, i.e., whether the hazardous material carried by vehicle 100 poses a health or environmental threat, whether vehicle 100 has been involved in an accident, hijacking, or other emergency, or whether the vehicle has received notification from a remote location that valve control system 112 should be activated.

FIG. 2 shows a detailed functional diagram of one embodiment of the valve control system 112. The valve control system 112 comprises a processor 200, memory 202, sensor interface 204, valve control interface 206, and optional transceiver 208. It should be understood that the elements shown in FIG. 2 are for illustrative purposes only, and that implementation of the valve control system 112 could be achieved in one of any number of ways using greater or fewer functional elements. For example, sensor interface 204 and valve control interface 206 could comprise the same physical hardware.

The processor 200 may comprise a CPU, gate array, logic, discreet circuitry, software, or any combination of hardware and software. The processor 200 receives various vehicle sensor inputs from sensor interface 204. Sensor interface 204 typically comprises electronic signals from, for example, an accelerometer, a Geiger counter, a roll-over detector, a temperature sensor, an input from a vehicle operator, an input from a remote location, and so on.

In one embodiment, the processor 200 operates to execute instructions stored in the memory 202 to perform the functions described herein. The instructions may be stored in the memory 202 during manufacture of the valve control system 112. In one embodiment, the instructions are stored on a computer-readable media, such as a floppy disk, hard disk, CDROM, flash memory, or any other type of computer-readable media. Alternatively, the instructions be received via the transceiver 208 or through sensor interface 204.

During operation of the valve control system 112, the processor 202 operates to detect that a hazard event has occurred, as defined above. In one embodiment, the hazard event is an event that occurs to the hazardous material itself. For example, the hazard event may comprise an increase or decrease in temperature, pressure, volume, or other physical property of the hazardous material as sensed by corresponding on-board sensors. Typically, a hazard event is declared by processor 200 if one or more physical properties of the hazardous material exceeds a predetermined threshold.

In another embodiment, a hazard event comprises an indication from a sensor designed to monitor containment of the hazardous material. For example, a temperature sensor located outside a storage container on vehicle 100 may sense an increase or decrease in temperature due to leakage of the hazardous material, or a liquid sensor may detect the presence of hazardous liquid material outside the storage container. In this embodiment, a predetermined threshold is typically exceeded, causing processor 200 to declare that a hazard event has occurred.

In another embodiment, a hazard event comprises an event that occurs to vehicle 100, such as an accident, malfunction, or hijacking that is detected by one or more vehicle sensors such as an accelerometer, air-bag deployment sensor, a microphone, etc. In another embodiment, the hazard event is based on input from the vehicle operator. For example, the vehicle operator may input an emergency code into the processor 200 via sensor interface 204 and the emergency code indicates that a hazard event has occurred.

In another embodiment, the hazard event is based on input received from a remote location. For example, central station 102 may transmit an emergency code to the vehicle via an MCT located on the vehicle or via transceiver 208. The MCT/transceiver 208 relays the emergency code to the valve control system 112 via sensor interface 204 or directly to processor 200, as the case may be. In response to the emergency code, the processor 200 determines that a hazard event has occurred. Of course, a hazard event may comprise one or more of the embodiments just mentioned.

Once processor 200 has determined that a hazard event has occurred, the valve control system 112 operates to respond by performing one or more response functions. In one embodiment, when a hazard event is detected, the valve control system 112 responds by controlling operation of a valve 210 located on vehicle 100. Valve 210 is typically used to allow materials carried by vehicle 100 to be loaded and unloaded. Typically, liquid material is loaded into a tank carried by vehicle 100 by connecting a hose or other suitable mechanism to valve 210. An operator generally opens valve 210 by mechanical means, such as a rotatable handle, which in turn positions a mechanical stop inside the valve to an "open" position, thus allowing the material to flow through the valve and into the tank. After the material has been loaded into the tank, the valve is closed by again turning the rotatable handle to a "closed" position, thereby positioning the internal mechanism to block the material from entering or being discharged from the tank.

In addition to being manually controlled by an operator, valve 210 may, in addition or, alternatively, be controlled by electronic means 212, such as a solenoid actuator. The electronic means 212 is responsive to an electronic signal provided by valve control system 112. For example, valve 210 can be opened, closed, or held in an open or closed position upon receipt of one or more signals from valve control system 112. Such signals may be generated upon the occurrence of a hazard event or, in one embodiment, under normal loading and unloading operations. For example, if processor 200 determines that the pressure of a hazardous gas carried within a tank onboard vehicle 100 has exceeded a predetermined threshold, processor 206 may send an electronic signal to electronic means 212, via valve control interface 206, to open valve 210 slightly to allow some of the hazardous material to escape the tank, thereby avoiding an explosion and possible major contamination of the environment surrounding vehicle 100. In another example, a hazard event is declared by processor 200 when a vehicle 100 is involved in an accident, sensed by an accelerometer, air-bag sensor, or some other sensor onboard vehicle 100. In this example, processor 200 may send an electronic signal to electronic means 212, via valve control interface 206, to close valve 210 or to keep valve 210 in a closed position.

Valve control system 112 may, alternatively or in addition to operating valve 210, respond to a detected hazard event by outputting one or more status messages for transmission to a remote location using either transmitter 208 or, if transmitter 208 is not present, using an external wireless communication terminal, such as the MCT, for transmitting messages to one or more remote locations. Thus, it is possible for the valve control system 112 to alert personnel at the one or more remote locations when a hazard event occurs and other information, such as the nature of the hazard event, the location of vehicle 100 at the time of the hazard event, etc.

In one embodiment, a remote location transmits one or more response messages to valve control system 112 in response to receiving a status message. In this embodiment, valve control system 112 does not control valve 210 until a response message is received from a remote location, or if a response is not received within a predetermined time period. For example, if the valve control system 112 transmits a status message to central station 102 to inform central station 102 that material being carried by vehicle 100 has exceeded a predetermined temperature, central station 102 may respond with a response message that instructs the valve control system 112 to operate valve 210, i.e., to open, close, or to have valve 210 remain in an open or closed position. The response messages are received either by transceiver 208 or by an external receiver, such as a receiver that is part of a the MCT, and provided to processor 200.

Figure 3:
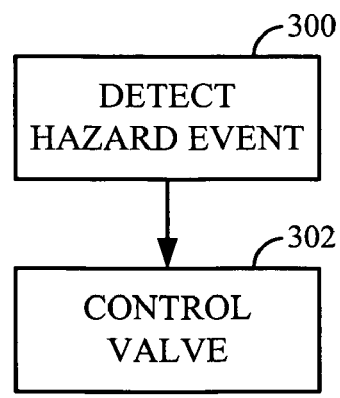
FIG. 3 shows one embodiment of a method for operating the valve control system of FIG. 1.

FIG. 3 shows one embodiment of a method for controlling a valve located on a vehicle that is transporting hazardous material. The method is suitable for use in one or more embodiments of a valve control system as described herein. For the following description, it will be assumed that a vehicle 100 is transporting liquefied propane inside a tank carried by vehicle 100.

In step 300, valve control system 112 determines that a hazard event has occurred, based on signals received through sensor interface 204 and/or transceiver 208. Sensor interface 204 is connected to one or more sensors located onboard vehicle 100, such as a temperature sensor, a pressure sensor, an accelerometer, a Geiger counter, etc. Sensors could also include an input device, such as a keyboard, used by a vehicle operator to enter information into, for example, a mobile communication terminal located onboard vehicle 100, or valve control system 112. The hazard event comprises an event that indicates that the hazardous material being transported by vehicle 100 may create a health or safety risk to people or the environment, whether vehicle 100 has been involved in an accident, has malfunctioned, been hijacked, is involved in some other emergency, or whether the vehicle has received notification from a local (i.e., vehicle operator via keyboard input) or remote location that valve control system 112 should be controlled for a reason either related to, or unrelated to, vehicle 100.

In step 302, the processor 200 sends an electronic signal to electronic means 212 to control valve 210. The electronic signal may cause valve 210 to open, close, or remain in an open or closed position.

A valve control system for use with a vehicle transporting hazardous material has been described that operates to control a valve in response to a hazard event. Accordingly, while one or more embodiments of a valve control system have been illustrated and described herein, it will be appreciated that various changes can be made to the embodiments without departing from their spirit or essential characteristics. Therefore, the disclosures and descriptions herein are intended to be illustrative, but not limiting, of the scope of the embodiments, which is set forth in the following claims.

I claim:

1. A method for controlling a valve located on a vehicle, comprising:

detecting a hazard event;

transmitting a status message indicative of the hazard event to a remote location;

receiving a second message in response to the status message, the second message comprising instructions for controlling the valve; and controlling operation of the valve upon detection of the hazard event.

2. The method of claim 1, wherein the hazard event is detected from a condition of the vehicle.

3. The method of claim 1, wherein the hazard event is detected form an input received from a vehicle operator.

4. The method of claim 1, wherein the hazard is detected from a message received from a remote location.

5. The method of claim 1, wherein the hazard event is detected when a sensed parameter exceeds a predetermined threshold.

6. Apparatus for controlling a valve located on a vehicle, comprising: means for detecting a hazard event;

means for operating the valve;

a transceiver being operable to transmit a status message to a remote location upon detecting the hazard event, the transceiver being further operable to receive a second message sent in response to said status message, the second message comprising instructions for controlling the valve; and means for controlling the operating means in response to the hazard event.

7. The apparatus of claim 6, wherein the means for detecting the hazard event comprises means for detecting the hazard event from a condition of the vehicle.

8. The apparatus of claim 6, wherein the means for detecting the hazard event comprises means for detecting the hazard event from an operator input.

9. The apparatus of claim 6, wherein the means for detecting the hazard event comprises means for detecting the hazard event from a message received from a remote location.

10. The apparatus of claim 6, wherein the means for detecting the hazard event comprises means for sensing a parameter onboard the vehicle.

11. Apparatus for controlling a valve located on a vehicle, comprising:

a transducer for detecting a parameter onboard the vehicle:

a solenoid for controlling operation of the valve;

a processor for determining a hazard event from the detected parameter; a transmitter for transmitting a status message, indicative of a hazard event, to a remote location; said processor being operable to receive a second message, including instructions for controlling the valve, in response to the status message, and sending a signal to the solenoid to control operation of the valve.

12. The apparatus of claim 11, wherein the transducer comprises an operator input device for receiving an operator input, wherein the hazard event is detected from the operator input.

13. The apparatus of claim 11, wherein the transducer comprises a vehicle parameter sensor, wherein the hazard event is detected from the vehicle parameter sensor.

14. The apparatus of claim 11, wherein the transducer comprises a receiver for receiving a message from a remote location, wherein the hazard event is detected form the message received from the remote location.

* * * * *